(12) United States Patent
Ettemeyer

(10) Patent No.: US 6,188,483 B1
(45) Date of Patent: Feb. 13, 2001

(54) METHOD AND APPARATUS FOR DETERMINING DEFORMATION AND ELONGATION ON CURVED BODIES

(75) Inventor: Andrea Ettemeyer, Neu-Ulm (DE)

(73) Assignee: Dr. Ettemeyer GmbH & Co., Neu Ulm (DE)

( * ) Notice: Under 35 U.S.C. 154(b), the term of this patent shall be extended for 0 days.

(21) Appl. No.: 09/325,839

(22) Filed: Jun. 4, 1999

Related U.S. Application Data

(63) Continuation of application No. PCT/EP97/06791, filed on Dec. 3, 1997.

(51) Int. Cl.⁷ ..................................................... G01B 11/02
(52) U.S. Cl. ............................................................. 356/496
(58) Field of Search ............................. 356/73, 357, 376

(56) References Cited

U.S. PATENT DOCUMENTS

| | | | |
|---|---|---|---|
| 4,591,996 | * | 5/1986 | Vachon ................................. 364/508 |
| 5,020,904 | * | 6/1991 | McMahan, Jr. ...................... 356/35.5 |
| 5,125,746 | * | 6/1992 | Lipshitz ................................. 356/376 |
| 5,440,392 | * | 8/1995 | Pettersen et al. ..................... 356/375 |
| 5,671,050 | * | 9/1997 | De Groot ............................... 356/359 |
| 5,684,596 | * | 11/1997 | Eslinger et al. ..................... 356/372 |
| 5,870,191 | * | 2/1999 | Shirley et al. ........................ 345/356 |
| 5,920,383 | * | 7/1999 | Chen et al. ............................ 356/32 |

FOREIGN PATENT DOCUMENTS

| | | |
|---|---|---|
| 2 230 650 | 12/1972 | (DE) . |
| 2 312 229 | 8/1974 | (DE) . |
| 27 08 653 | 11/1979 | (DE) . |
| 41 02 881 A1 | 8/1992 | (DE) . |
| 195 38 747 A1 | 4/1997 | (DE) . |
| 195 45 369 C1 | 4/1997 | (DE) . |
| 62-150110 | 7/1987 | (JP) . |
| 63-58205 | 3/1988 | (JP) . |
| 2-296103 | 12/1990 | (JP) . |

OTHER PUBLICATIONS

Optische Verformungsmesung zur Bauteildimensionierung am Beispiel von KFZ–Getrieben, Konstantin Galanulis and Detlef Winter—Technisches Messe 62 (1995) pp. 3–7.

Artwork diagnostics with fiber–optic digital speckle pattern interferometry, D. Paoletti, G. Schirripa Spagnolo, M. Facchini & P. Zanetta—Applied Optics (vol. 32, No. 31) (1993) pp. 6236–6241.

Plane–surface strain examination by speckle–pattern interferometry using electronic processing. D. Denby, J. Leendertz; Journal of Strain Analysis, vol. 9, No. 1, pp. 17–25 (Jan. 1974).

Digitale Specklemusterinterferometrie zur Messung Thermischer Dehnungen bei Metall–Keramik–Verbundbauteilen, P. Aswendt, R. Hoefling and W. Totzauer; Technisches Mesen 57 (1990) 6; pp. 241–244.

Kohaerent–optische Verfahren in der Oberflaechenmesstechnik, H.J. Tiziani; Technisches Messen 58 (1991) 6, pp. 228–234.

* cited by examiner

Primary Examiner—Frank G. Font
Assistant Examiner—Philip Natividad
(74) Attorney, Agent, or Firm—Evenson, McKeown, Edwards & Lenahan, P.L.L.C.

(57) ABSTRACT

The present invention provides a method and associated apparatus with which it is possible to implement both shape detection and also displacement measurement in particular using partially identical working steps. A method according to the invention for determining the displacement of at least a part of the surface of a measurement object between an initial condition and a measurement condition and the shape of that surface of the measurement object is characterized in that the operation of determining the shape and the operation of determining the displacement are effected with the same measurement method using the speckle effect.

35 Claims, 10 Drawing Sheets

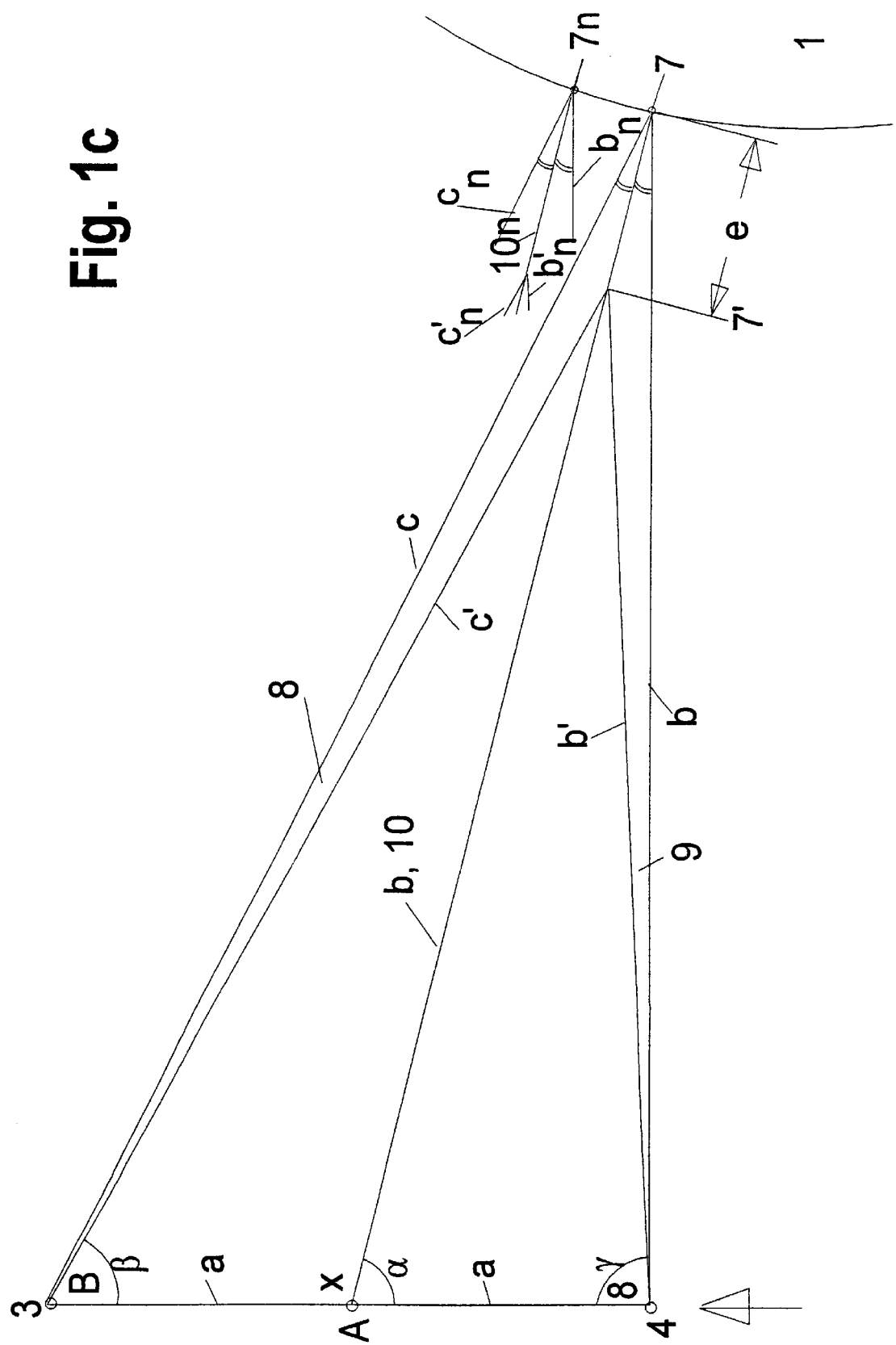

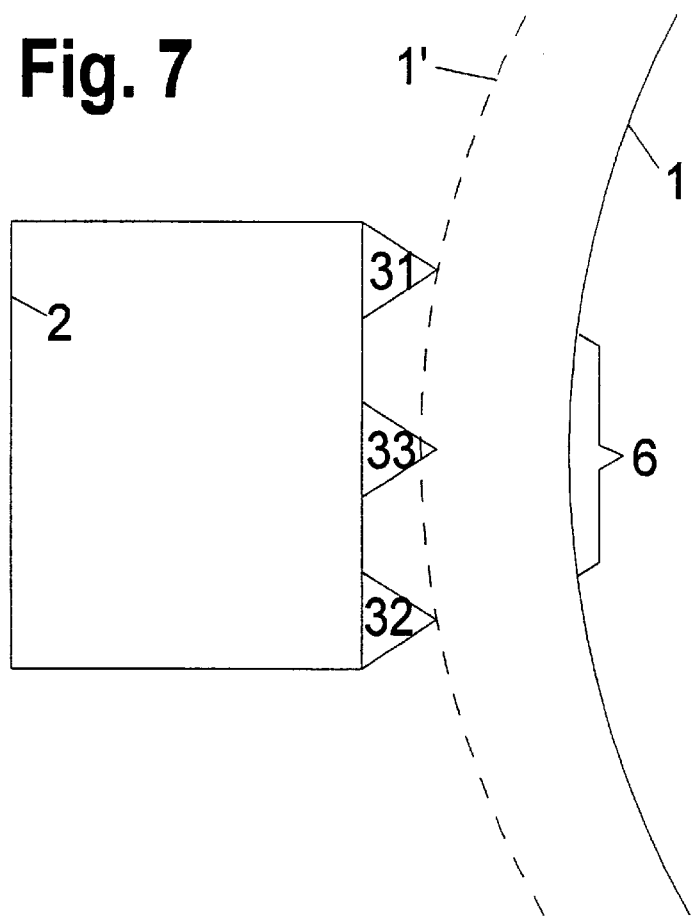
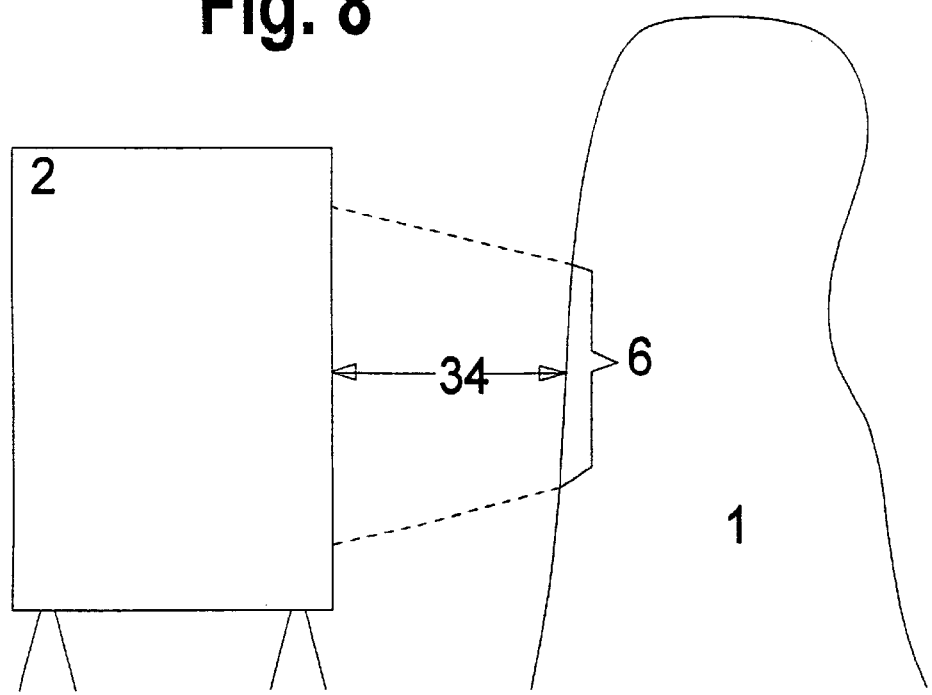

METHOD AND APPARATUS FOR DETERMINING DEFORMATION AND ELONGATION ON CURVED BODIES

This application is a continuation of PCT Application No. PCT/EP97/06791 filed Dec. 3, 1997.

FIELD OF THE INVENTION

The invention concerns a method and apparatus for determining deformation and elongation on curved bodies, and more particularly a method of determining displacement of at least a part of the surface of a measurement object between an initial condition and a measurement condition and the shape of said surface of the measurement object and apparatus for carrying the method into effect. The term measurement object is used herein to denote any appropriate object, deformation and the shape of at least a surface portion of which is to be measured.

BACKGROUND OF THE INVENTION

An operation of ascertaining, in respect of surface area, displacement of a part of or also the entire surface of an object, including a three-dimensional body of any shape, is a task which is essential in the context of many industrially relevant questions. Thus for example partial displacement of the surface of an object occurs in testing components for possible weak points, for the stress analysis of complex systems, and in checking components in regard to complying with certain stress limit values, insofar as, due to a loading, for example a compression loading, a body being observed is elongated slightly at the surface in the region of a weak point in its wall or its layer structure, or a hollow body also experiences complete elongation by virtue of a compression loading.

Known strain measurement methods are either very expensive in terms of application (for example wire strain gauges—only punctiform measurement, surface layer processes), highly inaccurate (brittle lacquer method) or can only be used under particular conditions (cyclic loading in the case of thermoemission analysis).

Speckle interferometry permits contact-less areal detection of displacement and/or deformation on any components. 2D- and 3D-speckle interferometers make it possible to determine deformation in two or three co-ordinate axes. For that purpose the components of the displacement of points of the surface, measured with the speckle interferometer, in one or more directions, for a very large number of points, are converted together into the co-ordinate system of the object or a spatial co-ordinate system. That will be described in greater detail with reference to the Figures.

Thus EP-A0 731 335 already shows such a method of detecting undesirable deformation of an object, which generally occurs under loading, in which speckle interferometry is used employing the specific method of shearography. In that procedure however the configuration of the object is not determined. The apparatus has two separate cameras and a double-armed Mach-Zehnder interferometer.

In addition DE-A-41 02 881 also describes a method of detecting deformation by means of speckle interferometry, in which case the particularity thereof is that the illumination necessary for 3D-deformation is used from different directions with light involving different properties (wavelength, polarisation etc) in order to be able to implement at the same time the recordings which are based on the different illumination directions, which is necessary in particular for detecting deformation on objects whose deformation does not come to a halt or which are to be observed during the deformation.

Knowledge of the object geometry and the relative position with respect to the speckle interferometer are however desirable for accurately determining the three-dimensional displacement vector.

The geometry of the object can either be inputted manually or it can be detected by a measurement procedure using another measuring instrument, for example a fringe projection system. In that case, the surface of a body is radiated with a regular pattern, in particular a simple fringe pattern, which gives a modified pattern on the surface of the body. If for example a ball is irradiated with such a fringe pattern, then the result obtained is lines which are ever increasingly curved outwardly in a lens configuration on the surface of the ball.

On the basis of knowledge of the geometrical data of the irradiation pattern and the spacing relative to the object, it is possible to compute therefrom the shape of the surface of the object.

The disadvantage of that mode of operation is the high level of financial expenditure involved in providing two different expensive measurement systems for displacement measurement and shape measurement.

SUMMARY OF THE INVENTION

An object of the present invention is to provide a method with which both shape detection and also displacement detection can be effected and calculated therefrom elongation and stress.

Another object of the present invention is to provide a method of determining displacement of at least a part of the surface of a measurement object and the shape of the measurement object, which is simple to implement while affording reliable operating results.

Still another object of the present invention is to provide apparatus for determining the shape and displacement of at least part of a surface of a measurement object, operable to supply accurate information results combined with a straightforward and easily overviewable operating procedure.

The foregoing and other objects are attained by the method and apparatus of the present invention.

As will be seen from embodiments described hereinafter, that is possible in that, in the case of speckle interferometry for displacement measurement, the respective phase difference between two light waves impinging on the same pixel of the light-sensitive measurement surface of the camera, generally a CCD-chip, is ascertained in any case on the one hand for the initial condition and on the other hand for the measurement condition of the object, and the difference value between the two phase differences allows conclusions to be drawn in relation to displacement of the corresponding point on the object. That can be effected not only for a single point but for all individual points which can be distinguished by the light-sensitive layer of the camera, and thus also permits information to be afforded about the entire viewing surface, that is to say each individual distinguishable point on the surface of the object in the viewing region.

If the initial condition of the object is used instead of the measurement condition in which the object to be measured is displaced or acted upon by force in some form, but parameters at the viewing side are altered, for example by varying the illumination direction and/or varying the viewing direction and/or varying the distance of the illumination unit and/or the viewing unit and/or the direction-changing mirrors used in that case and/or the wavelength of the light employed, then by comparison of two measurement steps which differ in terms of those parameters, but in each case on the same object which is left in the initial condition, it is possible to ascertain the relative position of individual points on the surface of the object relative to each other—and in the case of large-scale determination of such relationships of the surface points—the shape of the entire surface in the viewing region.

That means that the shape of the object is known for that condition in which the shape of the object was determined—generally the initial condition—and in addition the displacement of each individual one of the surface points ascertained, due to the variation of the object between the initial condition and the measurement condition, is known, the measurement condition generally being a condition in which a force has been applied.

That displacement of each individual point occurs as a vector, that is to say given by the three partial vectors in the three directions in space x, y and z. That information, specified raster-like for each observed point on the surface, is to be referred to as the displacement range or field. In that respect elongation in a given point on the surface of the object is the difference in respect of the displacement of that point—between the initial condition and the measurement condition—relative to the displacements of the adjacent points.

In regard to ascertaining in an object which is acted upon by a force, for example a hollow body which is acted upon by a pressure force, the stresses and elongation phenomena which occur there by virtue of such forces acting, the displacement of each individual point on the surface, specified in spatial co-ordinates, is however insufficient. On the contrary, for the elongation phenomenon, displacement of each point on the surface must be divided up on the one hand perpendicularly to the surface and on the other hand tangentially to the surface at that point, in the case of flat surfaces therefore in the direction of the surface. That is only possible if the shape of the surface is known at the respective point.

Therefore the displacement vector which is known for each point is calculated into the perpendicular and tangential displacement vectors with respect to the surface, having regard to the shape of the object which is generally known and which is thus also known in relation to that point on the surface, whereby elongation can be determined after conversion (differencing). That is referred to as the elongation range or field over all viewed points on the surface of the object.

As elongation is the result of the stresses which occur in the object, in particular in the surface of the object, in the transition from the initial condition to the generally loaded measurement condition, and which are expressed in a given degree of elongation by virtue of the material properties, in particular the modulus of elasticity of the material of the object, the stress range or field is now ascertained from the elongation field, having regard to the modulus of elasticity. For that purpose the elongation which is known for each point, divided up into perpendicular and tangential elongation vectors—having regard to the modulus of elasticity—the stress values are calculated in respect of amount and direction for the respective point, which can be present for example in the case of a hollow body in particular in the direction of the surface, and not transversely with respect thereto.

Further objects, features and advantages of the invention will be apparent from the description hereinafter of prefer embodiments.

BRIEF DESCRIPTION OF THE DRAWINGS

FIG. 1c shows a geometrical situation, FIGS. 7 and 8 are views in principle of the arrangement of the measuring unit relative to the object.

DESCRIPTION OF PREFERRED EMBODIMENTS

Reference will firstly be made hereinafter to FIGS. 1 through 5 to describe ascertaining the relative displacement of points on the surface of the measurement object 1 between the initial condition or normal condition on the one hand and the measurement condition, that is to say a condition in which the measurement object 1 has been acted upon by a force or displaced, on the other hand, as is in accordance with the ESPI state of the art.

Figure 1A:
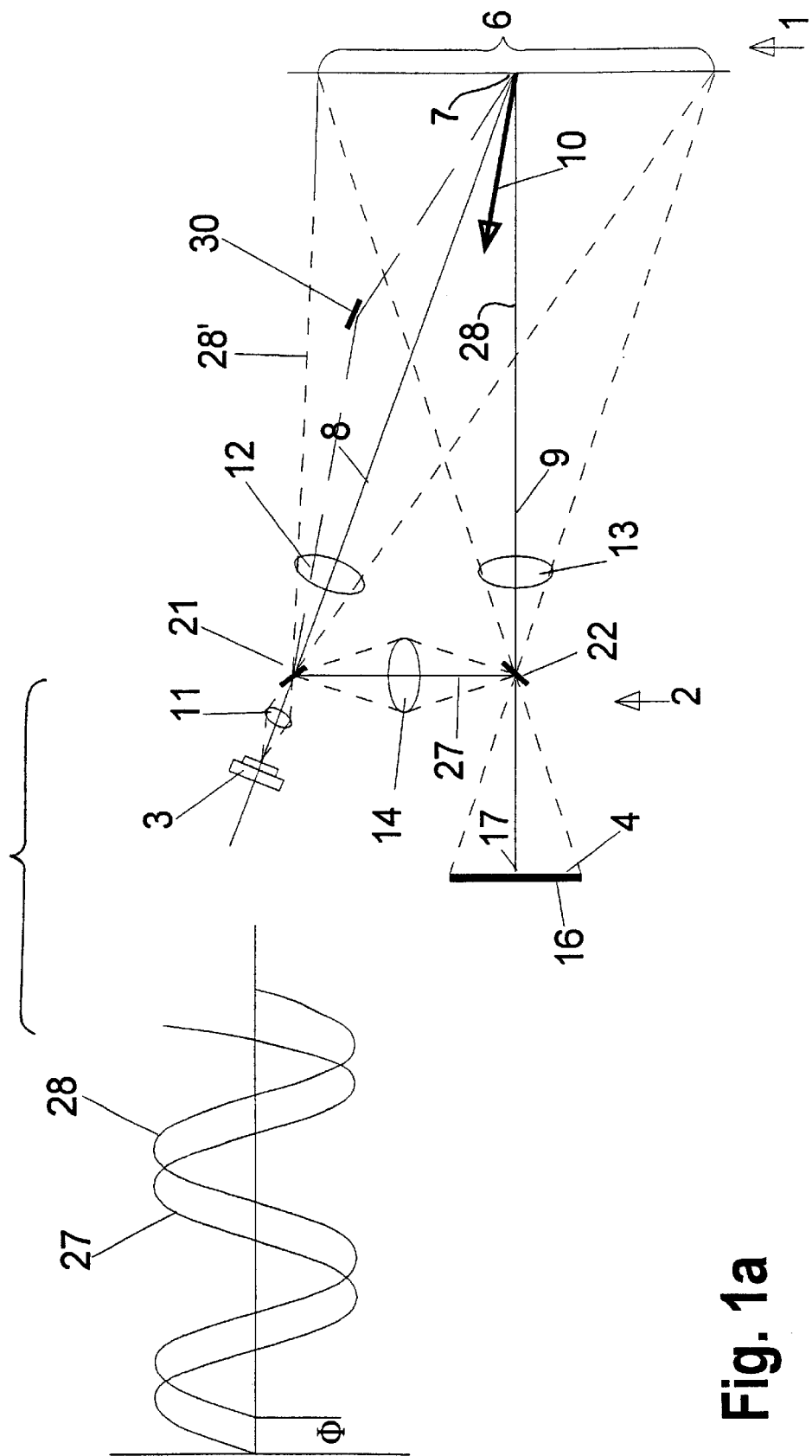
FIG. 1a is a view showing the principle of electronic speckle pattern interferometry (ESPI) with the measurement object in the initial condition.
Figure 1B:
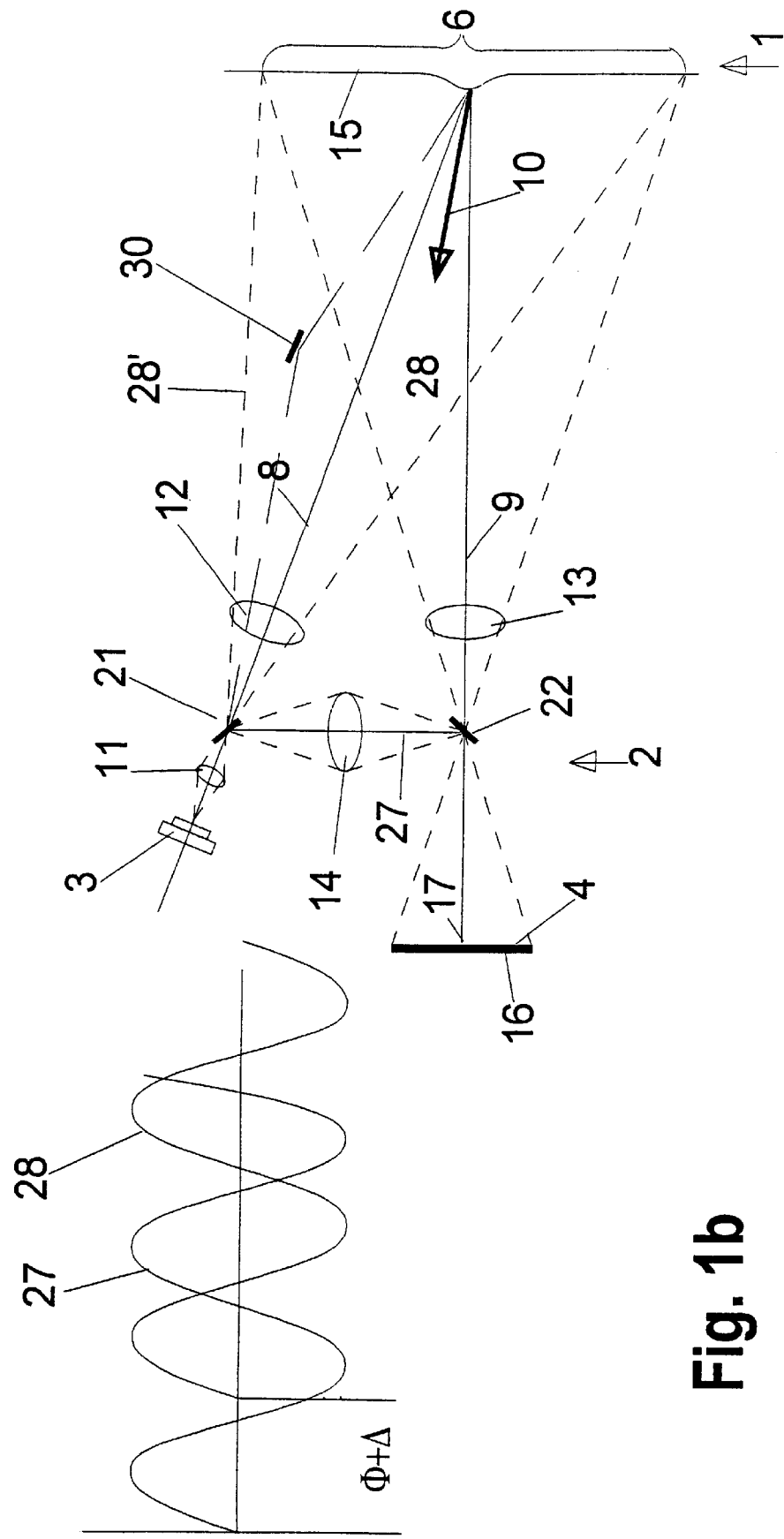
FIG. 1b is a view as shown in FIG. 1a with the measurement object in the loaded condition.

Generally in that respect the measurement condition is a loaded condition of the measurement object 1, insofar as the surface of the measurement object 1 generally for example due to a pressure loading thereon, moves towards the measurement unit 2 or also moves away therefrom (for example due to a tensile loading in parallel relationship to the observed surface of the measurement object). Partial displacements of the surface of the measurement object are likewise also possible, insofar as for example in the measurement condition small bulges occur on the surface of the object, as can be seen in FIG. 1b. In comparison FIG. 1a shows the situation in the initial condition of the measurement object 1. Except for the bulge shown in FIG. 1b, the relative position between the measurement object and the measurement unit is the same.

The basic principle of electronic speckle pattern interferometry, hereinafter referred to as ESPI for the sake of brevity, will firstly be described with reference to FIGS. 1a and 1b:

In this procedure, an observation or viewing region 6 on the surface of the measurement object 1 is irradiated with light of the same wavelength, in particular a laser 3, in the illumination direction 8, directly or by way of at least one direction-changing or surface mirror 30. The light beams which are reflected by the surface of the object are received in a viewing direction 9 which is different therefrom, by a camera 4, generally a high-resolution, areal CCD-sensor. For each individual object point on the surface in the viewing region 6 of the measurement object 1 therefore a light wave, the object wave 28, impinges on the camera 4, which upon impingement on the camera involves a given phase position, corresponding to the total travel distance covered from the laser 3 to the camera 4 and the wavelength used. The total travel length of the object wave however is not absolutely known.

A reference wave 27 also impinges on the camera 4. The reference wave 27 also originates from the laser 3 and is thus of the same wavelength, but, when it impinges on the camera 4, it can impinge thereon in a phase position which is different from the object wave 28, by virtue of following a different path. The reference wave 27 was not reflected from the measurement object and in particular has been branched out of the illumination beam for the object by means of a semi-transparent first mirror 21 which is set inclinedly relative to the viewing direction 8 and which is disposed between the laser 3 and the measurement object 1, and it is also guided on to the camera 4 by way of a second semi-transparent mirror 22 which is disposed in a position extending transversely with respect to the viewing direction 9 on that viewing direction 9.

In regard to the central rays of the conical or central beam of illumination rays and reflected rays, this is shown in the Figures in relation to a given point 7 on the object (FIG. 3), the image of which is formed as an imaging point 17 on the light-sensitive surface of the camera 4.

The same also happens for every other point on the surface of the viewing region 6 of the surface of the measurement object 1, each point of the viewing region 6 corresponding to a point on the light-sensitive surface of the camera 4.

Hereinafter all the operating procedures involved are only ever described in relation to the central object point 7 and the central imaging point 17, but it will be appreciated that the same also applies for all other points of the viewing region 6 and the light-sensitive surface 16 of the camera 4, as both illumination and viewing are effected not only by means of an individual light beam or light source but in each case by means of a bunch of beams so as to provide for viewing of the measurement object, in terms of an area thereon.

Therefore a reference wave 27 and an object wave 28 impinge on the imaging point 17 of the camera; the waves 27 and 28 generally differ in respect of their phase position upon impinging at the imaging point 17 by a phase difference $\Phi$ and may only coincidentally involve the phase difference 0.

In that respect for example the object wave 28 in going from the laser beam 3 to the camera 4 has covered a travel distance of x+0.1 times the wavelength $\lambda$ used, but in contrast the reference wave 27 has covered a distance of y+0.3 times the wavelength $\lambda$ used. The phase difference $\Phi$ is accordingly 0.2. The variables x and y, which are integral multiples of the wavelength, are not known and are also not detected.

That phase difference $\Phi$ is a different one for each of the imaging points on the light-sensitive surface 16 of the camera 4, and in a corresponding fashion each imaging point is more or less light. For the whole of the light-sensitive surface 16, that gives an irregular spot image with light and dark regions, as shown in FIG. 2a.

If the same procedure as has just been described above for a measurement object 1 in the initial condition is implemented for the measurement condition of the measurement object 1 as shown in FIG. 1b, then the object point 7, by virtue of the surface of the measurement object having been pushed up in that region, has moved somewhat closer to the measurement unit 2 in relation to the initial condition so that the object wave 28' now impinges on the imaging point 17 in a different phase position, corresponding to the altered shorter travel distance of the object wave. The reference wave 27' in contrast is identical to the reference wave 27 involved in measurement in the initial condition as the travel distance of the reference wave has not changed.

Accordingly between the reference wave 27' and the object wave 28' at the imaging point 17 there is now the measurement phase difference $\Phi+\Delta$, which consequently at the imaging point 17 on the light-sensitive surface 16 also differs in terms of its brightness in relation to the normal phase difference $\Phi$ obtained in the initial condition.

Figure 2D:
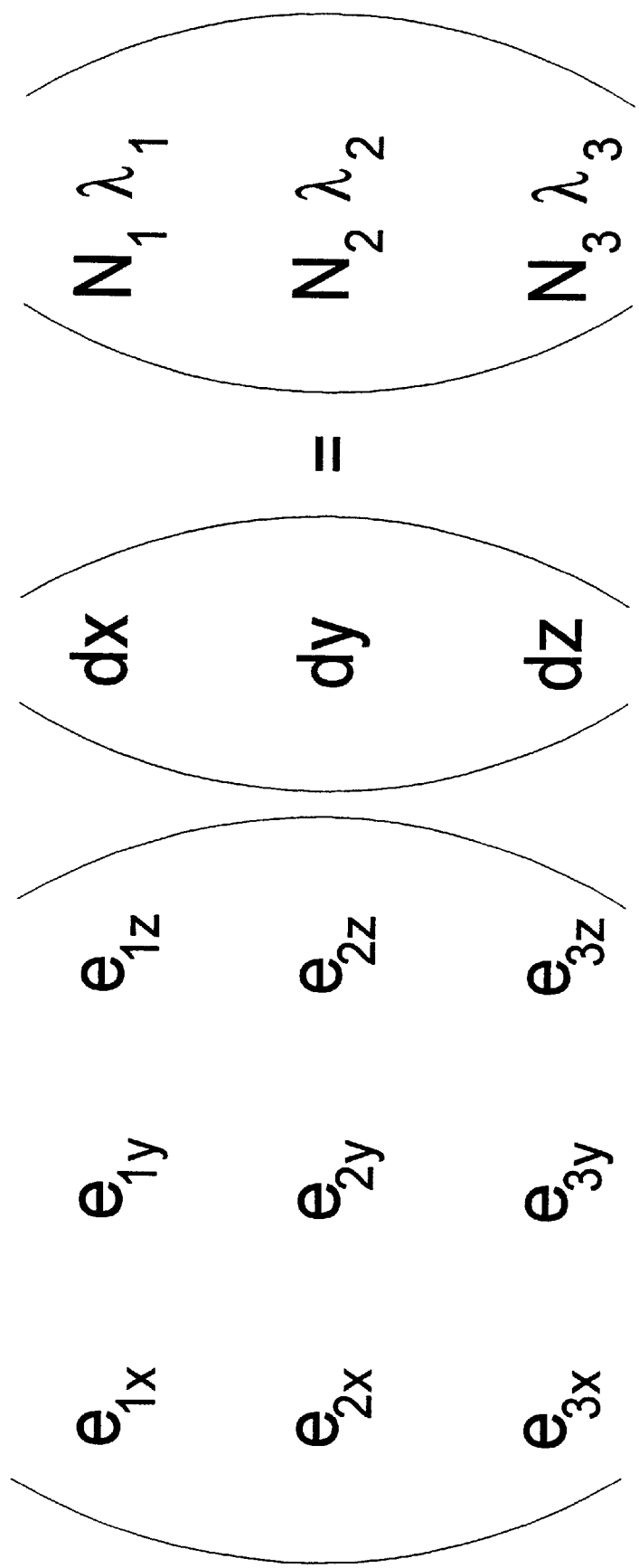
FIG. 2d shows an equation system.
Figure 2A:
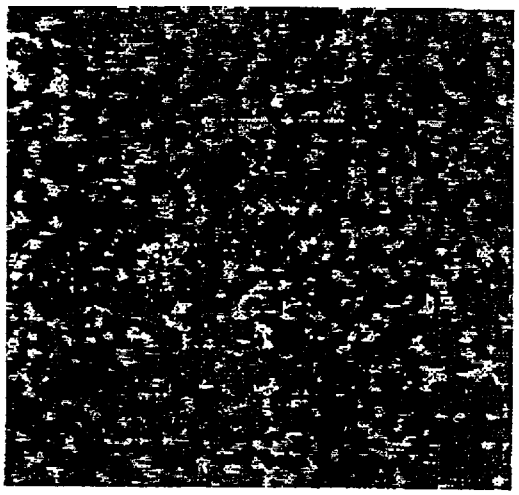
FIGS. 2a and 2b show spot images of the individual measurements.
Figure 2B:
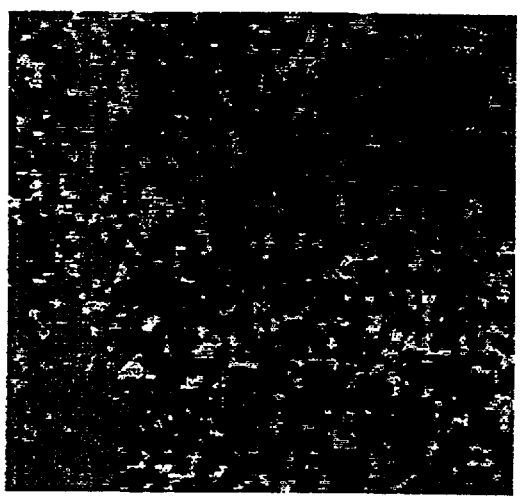

In the measurement condition therefore, for the entire light-sensitive surface 16, the result is a qualitatively approximately identical spot image which however in detail is irregular, for example in terms of the arrangement of the spots, as shown in FIG. 2b.

The difference value $\Delta$, that is to say the difference between the normal phase difference $\Phi$ and the measurement phase difference $\Phi+\Delta$ between the measurement in the initial condition and the measurement in the measurement condition at a given imaging point 17 thus—in the case of small displacements of the object point 7 between the initial condition and the measurement condition—corresponds to the altered travel distance of the object wave between the initial condition and the measurement condition.

On the basis of the angular relationships in the triangle, as shown in FIG. 1c, it is possible to ascertain the displacement e of the object point 7 between the initial condition 7 and the measurement condition 7' in the measurement direction 10:

The triangle formed by the laser 3, the camera 4 and the object point 7 or 7' respectively can be divided into two triangles by the angle bisector from the object point 7, which represents the measurement direction 10, in which case the angle $\alpha$ at which the measurement direction 10 encounters the connecting line between the laser 3 and the camera 4 is known by the geometry of the arrangement of the laser and the camera relative to each other, and roughly also the angles $\beta$ and $\gamma$ which represent the orientation of the laser and the camera.

The length of the side a of the triangle is known, more specifically half the direct distance between the laser 3 and the camera 4. As it is also known that the difference between the sides c and c' of the triangle corresponds to half the difference value $\Delta/2$, it is possible by way of the angular relationships in the triangle to calculate the displacement component e of the object point 7 in the measurement direction 10 on to the object point 7' in the measurement condition.

It is always assumed in that respect that the displacement e is less than half the difference value $\Delta/2$. If the displacement is greater, it is possible to determine the additional integral multiple of $\lambda$ or $\lambda/2$ from the comparison with adjacent points.

In practice that is effected for not just one imaging point 17 on the camera but the entire light-sensitive surface 16 of the camera, insofar as the spot images from the initial condition and from the measurement condition, as shown in FIGS. 2a and 2b, are subtracted from each other, insofar as, for each point on the light-sensitive surface 16, the light value from the measurement condition is subtracted from the light value from the initial condition. That then gives a fringe pattern as shown in FIG. 2c for the light-sensitive surface 16 overall.

The fact that the difference between two irregular spot images in regard to subtraction from each other gives a regular strip-shaped or striated image is because, between the initial condition and the measurement condition, object points 7, 7a, 7b which are in closely side-by-side relationship are displaced similarly insofar as no tear or hard step or break is produced by the measurement condition in the surface of the object.

Figure 2C:
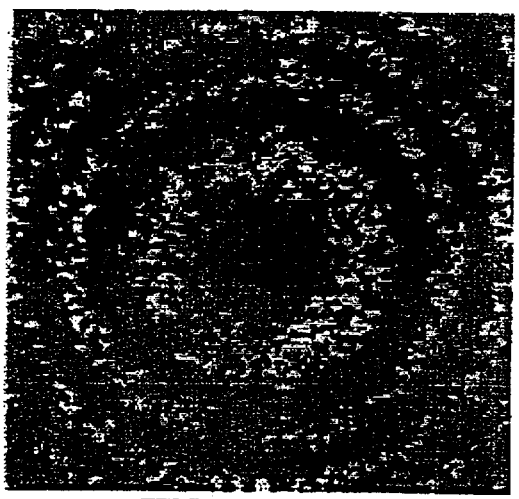
FIG. 2c shows the difference image from 2a and 2b.

The fringe pattern in FIG. 2c thus represents a difference image in respect of the light values of all points of the camera surface.

As the light difference values in each individual point make it possible to ascertain the difference value $\Delta$, by means of the camera, in particular a digitally operating CCD-sensor, for each individual point of the light-sensitive surface 16, it is possible on the basis of the fringe pattern shown in FIG. 2c and by evaluation by means of an electronic arrangement and associated software, to implement the calculation shown in FIG. 1c, namely displacement of each individual object point in the measurement direction 10, for each point of the viewing region on the surface of the measurement object 1.

It will thus be clear from the foregoing description that in ESPI the important consideration is the impingement of two light waves on the same point of the camera, in which respect the phase difference between the two waves is different in the initial condition and in the measurement condition and the displacement of the corresponding object point is determined from the difference value in respect of the two phase differences.

Figure 3:
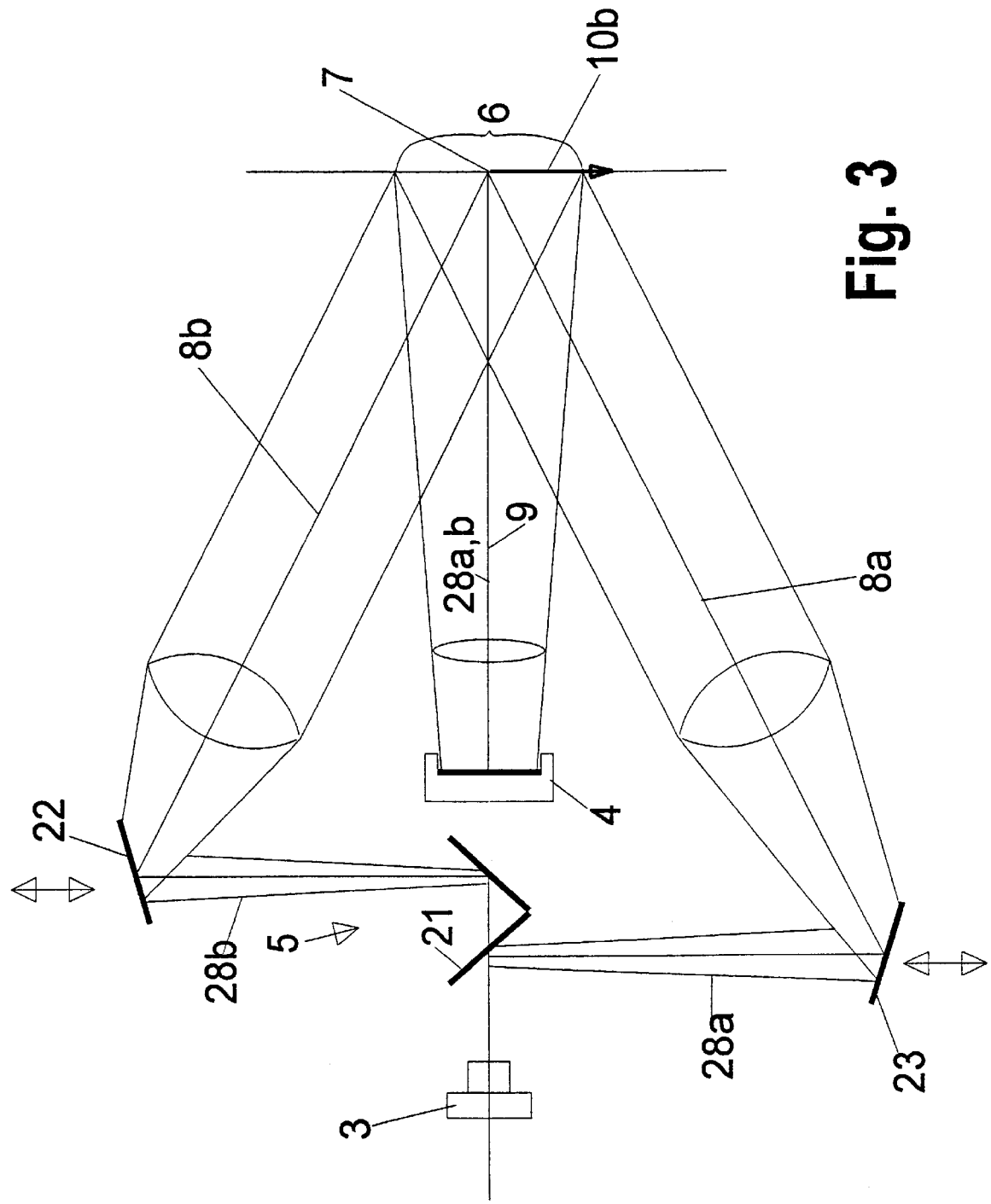
FIG. 3 is a view showing the principle of ESPI by means of dual illumination.

The two light waves required do not necessarily have to be the object wave 28 reflected by the object and the reference wave 27. As FIG. 3 shows it is also possible for this purpose to use two object waves 28a, 28b which are obtained by simultaneous illumination of the viewing region 6 of the object 1 from two different illumination directions 8a, 8b.

The different illumination directions can be achieved from one and the same laser 3 by means of a beam splitter 5. In that case the laser 3 is directed approximately on to the viewing region 6 and in the beam splitter 5 passes through a first semitransparent mirror 21 which laterally deflects a first object wave 28a while the remaining wave is somewhat later laterally deflected in the form of a second object wave 28b in the direction of the laser 3, in the opposite direction therefore to the first object wave 28b.

Each of the two object waves 28a, 28b is deflected in its further course on to the same viewing region 6 by way of a completely opaque mirror 22 and 23 respectively. From the viewing region 6 the object waves 28a and 28b are reflected back on to the camera 4 approximately on the angle bisector between the illumination directions 8a, 8b and are recorded at the camera 4 which is for example between the laser 3 and the viewing direction 6.

In this case an additional reference wave which is therefore passed without contact with the object from the laser directly to the camera is no longer employed.

The essential difference in regard to the mode of operation shown in FIG. 3 in comparison with FIG. 1 is however that this dual illumination procedure does not make it possible to determine displacements of the object point 7 in the viewing direction 9, that is to say towards the camera 4, as upon displacement of the object point 7 on the viewing direction—insofar as this is the angle bisector from the illumination directions 8a and 8b—would also result in the same phase displacement in relation to both object waves 28a, 28b and consequently would result in a difference value $\Delta=0$.

When adopting the mode of operation as shown in FIG. 3 however it is possible to determine displacements of the object point 7 transversely to the viewing direction 9 between the initial condition and the measurement condition as that causes a different variation in the phase position of the two object waves 28a and 28b and thus results in a difference value $\Delta$ which by way of the angular relationships in the triangle makes it possible to ascertain the displacement perpendicularly to the viewing direction 9, in the plane defined by the two illumination directions 8a, 8b.

The measurement direction 10b of the dual illumination method as shown in FIG. 3 is thus transverse and in particular perpendicular to the viewing direction 9 and in the plane which is defined by the two illumination directions 8a, 8b. The viewing direction 9 is once again in particular the bisector between the two illumination directions 8a and 8b.

Figure 5:
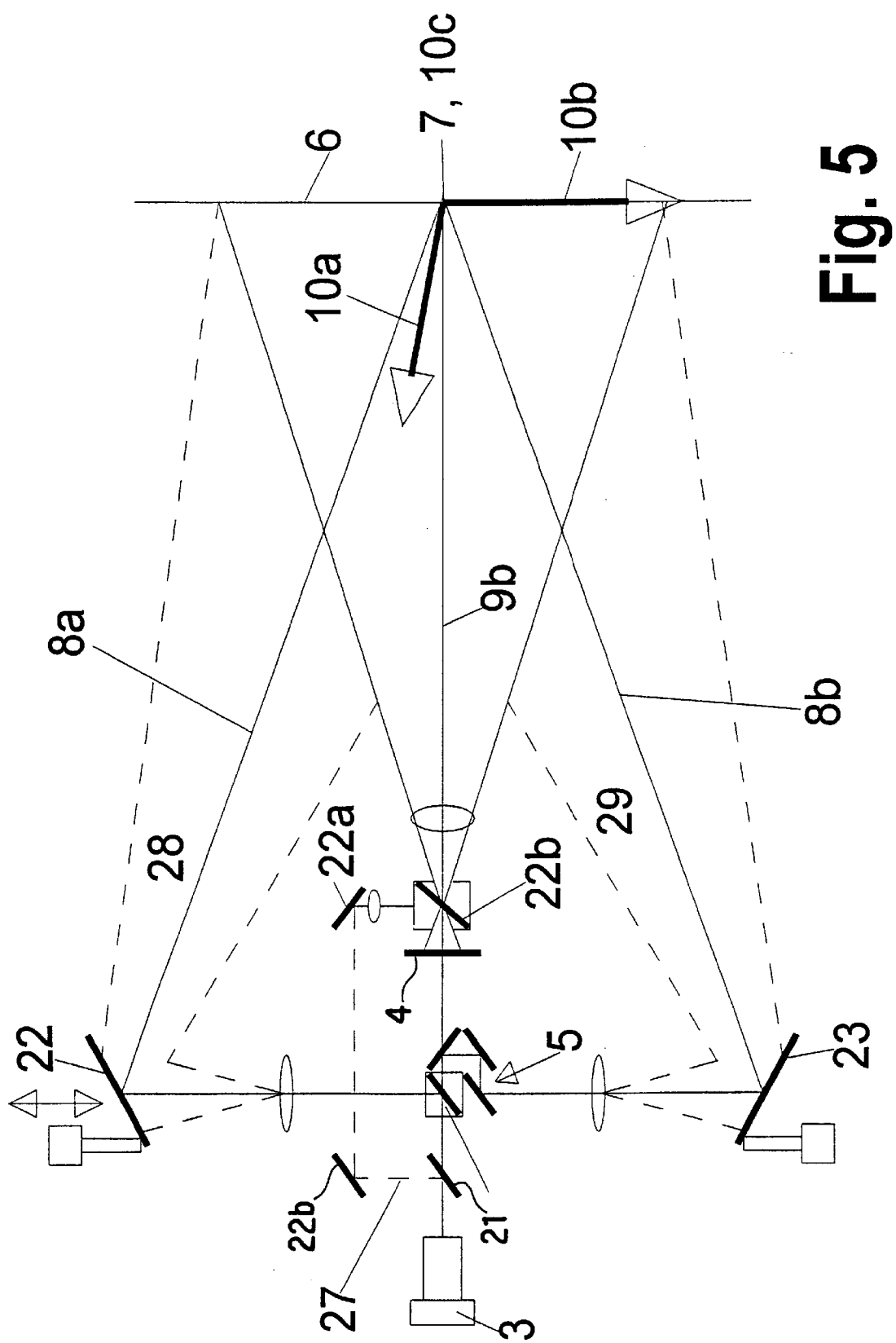
FIG. 5 is a view showing the principle of a three-dimensional ESPI measurement apparatus, FIG. 6 are views in principle of speckle fringe patterns.

FIG. 5 shows an arrangement which combines the apparatuses and operating procedures shown in FIGS. 1 and 3:

On the one hand, two illuminations from different directions provide for ascertaining displacement in a measurement direction 10b transversely with respect to the viewing direction 9b, generally the angle bisector between the two illumination directions 8a and 8b, accordingly therefore generally in the direction of the object surface.

On the other hand, the displacement of the same object point 7 is ascertained in a measurement direction 10a which is at an angle to the measurement direction 10b and represents the angle bisector between one of the illumination directions, for example 8a and the viewing direction 9a=9b.

The reference wave 27 required for this purpose—in addition to the beam splitter 5—is branched out of the path of the light beams between the laser 3 and the beam splitter 5, preferably upstream of the beam splitter 5, by means of a semitransparent mirror 21, and passed by means of further mirrors 22a, 22b again directly and without contact with the object to the camera 4.

If in addition dual illumination is provided in duplicate, that is to say not only in the form of the illumination devices 8a and 8b which are disposed in the plane of the drawing in FIG. 5 but by virtue of further illumination devices 8c and 8d (not shown) which are preferably at a right angle in relation thereto, in which case however the angle bisector resulting therefrom, the viewing direction 9, is identical to the viewing direction 9 which is shown in FIG. 5, besides the measurement direction 10b shown in FIG. 5, there is also a further measurement direction 10c which is also perpendicular to the viewing direction and thus preferably in the plane of the object surface, but at an angle, in particular at a right angle, to the measurement direction 10b.

In that way displacement of the object point 7 of the initial condition to the object point 7' of the measurement condition is known in three mutually different measurement directions 10a, 10b, 10c, in which respect it is immaterial whether the displacements are ascertained in the three different measurement directions 10a, 10b, 10c by one and the same apparatus or by separate measurement apparatuses or even measurement procedures.

It is possible to produce therefrom an equation system as shown in FIG. 2d, wherein the components $e_{1x}$, $e_{1y}$, $e_{1z}$ are the displacement components of the object point 7 in the first measurement direction 10a and $N_1$ is the amount of such displacement in the measurement direction 10a, given in the wavelength $\lambda 1$ used in that respect.

A similar consideration applies in regard to the second and third lines of the equation measurement system for the further measurement directions 10b and 10c.

If measurements are implemented in more than three different measurement directions, the equation system is theoretically over-defined. In practice however the fourth and each further measurement direction serves to reduce the influence of false measurements, signal noises and the like and to improve the measurement result.

In general the wavelength used in the operations for determining the displacements in the three measurement directions will be the same so that the values set are to be such that $\lambda 1 = \lambda 2 = \lambda 3$, but at least $\lambda 1$, $\lambda 2$ and $\lambda 3$ are known.

In accordance with the known rules for solving an equation system comprising three equations with three unknowns therefore it is possible to ascertain the factors dx, dy and dz which are the components in the three mutually perpendicularly disposed directions x, y and z in space, by which an object point 7 is displaced from the initial condition to an object 7' in the measurement condition, that is to say in the loaded condition of the measurement object. That means that the relative displacement of the object point is known in terms of spatial co-ordinates.

Figure 6:
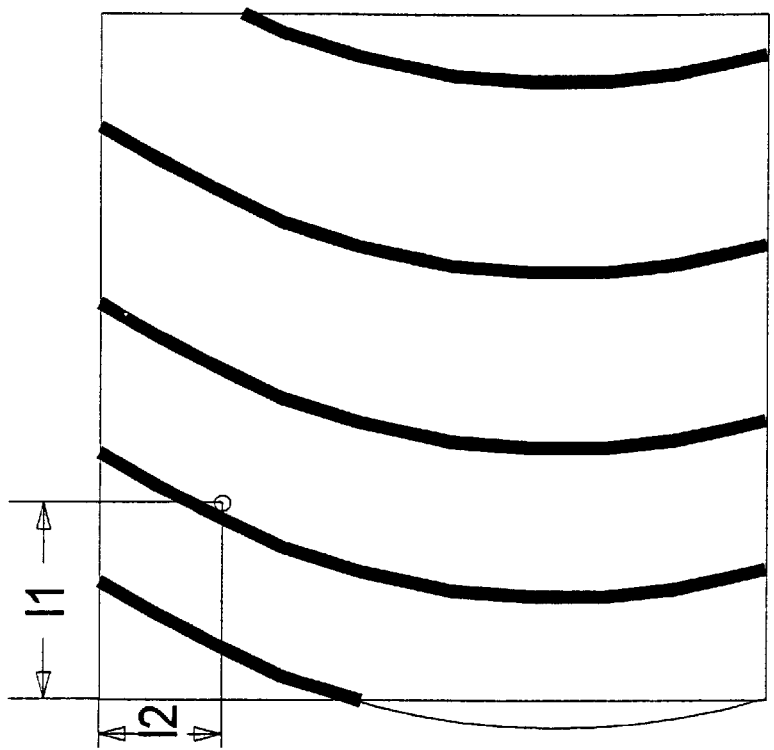
Figure 6:
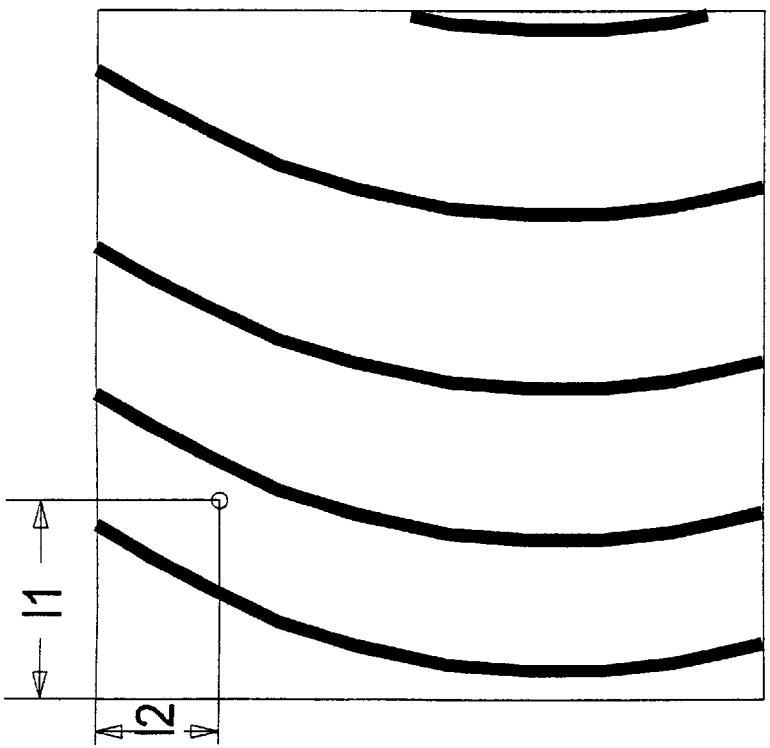

It is also possible to arrive at the same result by comparison of the three fringe patterns which are produced for the three measurement directions 10a, 10b, and 10c in each case as a difference image in respect of the speckle patterns—as shown in FIG. 6—, if in that case the camera surface has remained the same in terms of its orientation with respect to the object as for example in the case of the arrangement shown in FIG. 5, with which 3D-ESPI is operated:

In that case one and the same object point always adopts the same position on the camera surface in the three fringe patterns, that is to say for example spaced horizontally from the left-hand edge by the distance L1 and spaced vertically from the upper edge by the distance L2. If it is found for example that in the measurement direction 10a that imaging point 17 is arranged between the second and third fringes, 10% away from the second strip, whereas in the fringe pattern in respect of the measurement direction 10b it is admittedly between the same two fringes but 80% away from the second fringe and in regard to the measurement direction 10c it is precisely in the center between the second and third fringes, it is then possible in that way, having regard to the spatial association of the three measurement directions 10a, 10b and 10c, to ascertain the three-dimensional displacement of the imaging point, more specifically even if the object point in the two fringe patterns should lie between different fringes.

It is also to be noted that all the foregoing considerations have been based on the point that displacement of an object point between an initial condition and the measurement condition in the measurement direction, that is to say the vector e in FIG. 1c, is to be less than about half the wavelength of the light used. If that were not ensured, it could happen that the travel length of the light between the initial condition and the measurement condition would have differed not only by the measured difference value $\Delta$, but in addition also by an integral multiple of the wavelength $\lambda$.

If the vector e is larger than $\lambda/2$ it is nonetheless possible to ascertain the displacement if the entire displacement vector from the initial condition to the measurement condition is known for at least one object point in the measurement window, insofar as that point then serves as a comparative point for adjacent points, and those in turn for their adjacent points and so forth.

If that prerequisite is not met, for example a plurality of measurement steps have to be implemented in succession, that is to say for example only partial loading of the object has to be implemented for the first measurement condition. The second measurement step provides that the first measurement condition, that is to say the measurement condition of the first measurement step, is at the same time the initial condition for the second measurement step in which once again a further partial loading is applied until the desired final loading is attained.

The partial displacements which result therefrom in respect of each individual surface point are finally added.

A further problem which arises is that—precisely for ascertaining elongation and stress in the surface of a hollow body—the partial, over-proportional elongation phenomena in a given region of the surface, which are generally to be attributed to material flaws and which are sought to be ascertained precisely for that reason, have superimposed thereon the overall or total elongation of the hollow body due to the pressure acting thereon.

As shown in FIG. 7 however the entire surface of the object 1 is displaced relatively substantially outwardly, that is to say towards the measurement unit 2, by virtue of the elongation effect when pressure is applied to the interior of the hollow object 1.

In comparison, the additional displacement of the outward bulge portion 15, as shown in FIG. 1, out of the configuration of the rest of the surface of the object 1 is relatively slight.

Therefore either the measurement unit 2 and its viewing region 6 (FIG. 8) are positioned at a defined spacing 34 relative to the object 1 and its viewing region 6 (FIG. 8) or the measurement unit 2 is fitted with its feet 31, 32, 33 directly on to the surface of the measurement object 1 (FIG. 7) advantageously arranged in an isosceles triangle, and remains there even during the transition of the object from the initial condition into the measurement condition.

As, in relation to the viewing region 6, the surface of the object 1 does not alter in terms of its shape, but is only displaced together with the measurement unit 2 relative to the center of the measurement object 1, then de facto only the occurrence of the bulge portion 15 is detected by the measurement unit 2 between the initial condition and the measurement condition.

Figure 4:
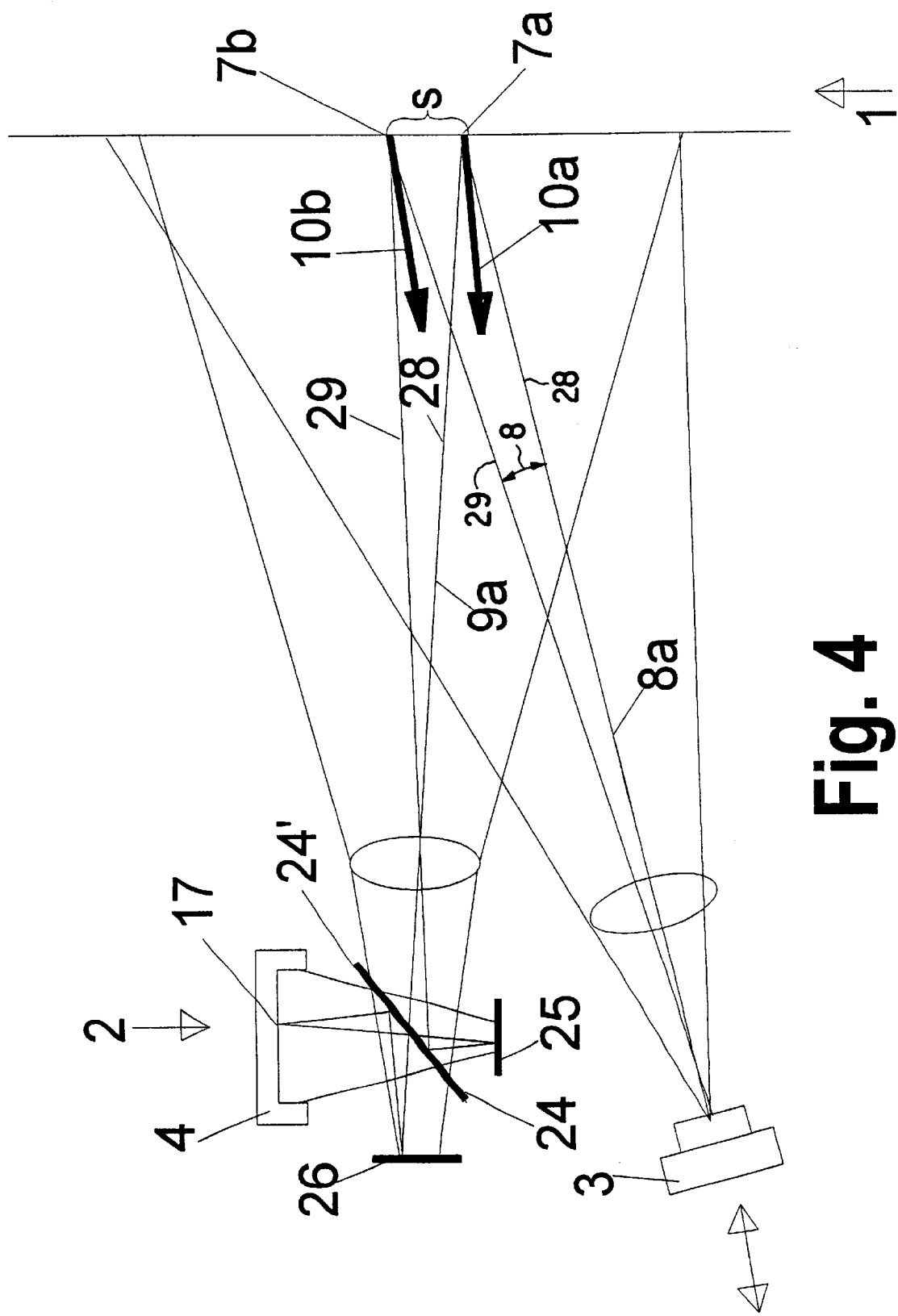
FIG. 4 is a view showing the principle of ESPI by means of shearing of the object points.

FIG. 4 shows a further mode of operation, what is referred to as shearography, which can be used as an alternative to the mode of operation with the object wave and the reference wave as shown in FIG. 1, as it also makes it possible to ascertain the displacement of an object point in a measurement direction 10a which is the angle bisector between an illumination direction 8a and a viewing direction 9a.

Instead of a reference wave however, the procedure here also uses two object waves 28, 29 which impinge on the same imaging point 17 of the light-sensitive surface 16 of the camera 4.

It will be noted however that those two object waves 28, 29 which generally originate from the same laser 3 and which in particular are of the same wavelength are reflected by two different object points 7a, 7b on the surface of the object 1.

The two object points 7a, 7b are spaced from each other by the shearing distance s on the object surface, in the plane which is defined by the illumination direction 8 and the viewing direction 9.

The two non-congruent object waves 28, 29 which are reflected by the two object points 7a, 7b and which extend at an angle relative to each other are passed by suitable deflection on to the same point on the light-sensitive surface 16 of the camera 4, by for example a semitransparent mirror 24 being arranged in the beam path in such an inclined position that the first object wave 28 passes through that mirror while the second object wave 29 which is at an angle in relation thereto is deflected by the mirror. It is then possible by means of further mirrors 24, 25 and 26 to direct the object waves which are completely separated in that way on to the same imaging point 17 of the camera 4.

In this case also, both in the initial condition and in the measurement condition, there is between the two object waves 28 and 29 at the imaging point 17 a normal phase difference $\Phi$ and a measurement phase difference $\Phi+\Delta$ respectively, which differ by the difference value $\Delta$.

As the difference in angle between the object waves 28 and 29 is known from the arrangement of the optical system which passes the two object waves 28 and 29 on to the same imaging point 17, the shearing distance s is also known by means of geometrical rules, on the basis of the distance of the measurement unit 2 from the measurement object 1.

It is also possible in that way, in accordance with geometrical laws, to ascertain the different travel distances or lengths of the two object waves 28 and 29, insofar as the distance between the measurement unit 2 and the object 1 is not known, at least relative to each other.

It is consequently possible to determine in a similar manner from the difference value $\Delta$ the displacement of the object 7a or 7b respectively in a viewing direction 10, the direction of which for the two object points 7a and 7b can be assumed to be virtually parallel, and can also be equated in terms of magnitude on the basis of the very short shearing distance s.

It will thus be clear that the methods of ESPI make it possible to determine displacements of object points 7 on the surface of an object, irrespective of whether such displacements are caused by virtue of the object being subjected to the effect of a force or by virtue of overall displacement of the object.

In order however, prior to displacement occurring, to determine the spatial shape of the object surface which, for the above-described modes of operation, can be assumed to be flat only in the viewing region 6, it is now proposed in accordance with the invention also to determine the spatial shape of the surface of the object 1, in a modification of the modes of operation involved, in particular using the items of equipment as are employed in ESPI.

The basic concept in this respect once again provides, as in the case also of ESPI, determining a difference value $\Delta$ by virtue of a variation in the travel length of at least one first object wave 28, as described hereinbefore.

While however in the case of ESPI the difference value $\Delta$ serves to determine the displacement of the object point 7 in the initial condition to an object point 7' in the measurement condition, in terms of direction and magnitude, that displacement distance of the object point as between the initial condition and the measurement condition can precisely be presumed to be known as that displacement e is in fact known by virtue of a suitable variation in the travel length of an object wave and/or a specific variation in the spacing of the measurement unit 2 relative to the object 1.

In regard to the mode of operation in FIG. 1 therefore the geometrical situation as shown in FIG. 1c still applies. Therefore the following are known for the upper triangle:

The length of the side a of the triangle as half the distance between the laser 3 and the camera 4, the angle $\alpha$ at the impingement point of the viewing direction 10 as the angle bisector precisely at the center between the laser 3 and the camera 4 and, by virtue of a specific variation in respect of the measurement unit or in the beam path of the object waves, the displacement e in the measurement direction 10, that is to say along the side b of the triangle.

The length of the displacement e in the measurement direction however was that magnitude which was precisely to be determined in ascertaining the displacement. That displacement e or the variation in the travel distance of the object wave, corresponding to that displacement e, is however already known insofar as it is definedly predetermined, that is to say for example the measurement unit 2 is moved towards or away from the measurement object 1 in the measurement direction 10 by the displacement e.

Nonetheless that displacement by e, even if defined, in turn affords a difference value $\Delta$.

For an object point 7a adjacent to the object point 7, it is found that the displacement of the measurement unit 2 by a given amount in the measurement direction 10 does not produce the same variations in the travel distance of the object wave but variations which are each slightly different from each other, at all object points 7, 7a and so forth of the viewing region 6.

That will be understood if it is realised by referring to FIG. 1c that the measurement direction 10 which is for example the connection of the object point 7 disposed at the center of the viewing region 6 to the center of the measurement unit, that is to say the angle bisector between the illumination direction 8 and the viewing direction 9, and the center between the laser 3 and the camera 4, meet at the foot or base point A.

The displacement e affords for the object point 7 for example the difference value $\Delta$.

For an adjacent object point 7n the measurement direction 10 in which the displacement occurred by the amount e is no longer exactly the angle bisector between the illumination direction 8 and the viewing direction 9. Consequently the displacement in the viewing direction 10 by the amount e produces a difference value $\Delta_n=\Delta+n$, that is to say a difference value which differs by n from the difference value $\Delta$ of the object point 7. That difference amount n however, in relation to the measurement direction 10, represents the difference in the distance of the object points 7 and 7n relative to the measurement unit.

Quantitative determination of those differences makes it possible to ascertain the differences in the spacings, in particular as viewed in the measurement direction, of the individual object points 7, ..., 7n ... of the viewing region 6 with respect to the measurement unit 2, but in each case only in the measurement direction 10. That determines the 3-dimensional shape of the surface. By effecting two or preferably even three such measurement operations from different measurement directions, it is possible to refine the relationship between respective adjacent object points in the three directions in space.

By coupling together viewing regions until the desired surface portion of the object or the entire surface of the object overall is covered, it is possible to determine the overall three-dimensional shape of the object.

Ascertaining the absolute spacing or the position of the object relative to the measurement unit is not yet linked thereto.

As this is also effected for all surface points of the viewing region 6 on the object 1 and thus for the impingement points, corresponding to those surface points, on the light-sensitive surface 16 of the camera 4, the three-dimensional shape of the surface of the measurement object 1 in space can be determined.

In that respect, in regard to the individual ESPI-methods, the procedure involved for ascertaining the shape in question is as follows:

In the case of the mode of operation as described with reference to FIG. 1, with a reference wave 27 and an object wave 28, the travel length of the object wave 28 is varied. That can be effected by varying the distance of the entire measurement unit 2 from the measurement object 1, for example in the viewing direction 10, by a defined amount of the displacement e.

It is however also possible to guide the laser 3 with its illumination direction 8 not directly on to the viewing region but at a shallower angle relative to the viewing direction 9 broken line in FIG. 1a). Then, after passing through the first mirror 21 for separating off the reference wave 27, as shown in FIG. 1d, the object wave 28 has to be deflected by means of a further deflection mirror 30 on to the object point 7.

Altering the position and/or varying the inclined positioning of that mirror 30 by a defined amount also specifically varies the length of the travel distance of the object wave 28' which is guided by way thereof.

Similarly, in the case of the dual illumination procedure as shown in FIG. 3, which does not involve the use of a reference beam, it is possible to alter either the position of at least one of the mirrors 22, 23, in particular the spacing thereof transversely with respect to the viewing direction, and/or the angular positioning thereof.

In particular when using the method of dual illumination, varying the spacing of the two deflection mirrors 22, 23 perpendicularly to the viewing direction 9 and by the same amount, that is to say towards the right or towards the left in each case, will be preferred. The advantage of that operating procedure is that in that case the resulting fringe patterns show the configuration of the surface of the object in a manner which is clear to the man skilled in the art, in a kind of contour or height lines.

In the case of the apparatus shown in FIG. 5 which combines the operating procedures shown in FIG. 1 and FIG. 3 therefore at least the position and/or angular positioning of that deflection mirror 22 whose object wave 28 is related to the reference wave 27 is to be altered.

In relation to shearography as described with reference to FIG. 4 the difference angle δ between the two object waves 28, 29 and therewith the shearing distance s is altered, preferably by altering the angular positioning at least of the semitransparent mirror 24 and possibly the further mirrors 25, 26, 24', in which respect the mirror 24' is generally the rear side of the mirror 24.

Another option however is also a variation in position either of the entire camera unit, that is to say with the optical system for bringing the beams together, in the viewing direction, and/or a variation in the position of the laser 3 in the illumination direction 8 and/or a variation in the angle between the viewing direction 9 and the illumination direction 8.

In addition, instead of variations at the measurement unit, it is also possible to alter only the wavelength of the light used, that is to say measurement can be implemented in succession with different lights.

The difference value Δ is always a fraction of the wavelength used, that is to say less than half such a wavelength λ.

If the normal phase difference Φ was ascertained with a wavelength λ1 and the measurement phase difference Φ+Δ was ascertained with another wavelength λ2, this means that the following must apply:

$$\Phi \cdot \lambda 1 = (\Phi + \Delta) \cdot \lambda 2.$$

as there has not been any change in the travel length of the object waves.

In addition, the following applies in relation to the total travel distance of the object wave 28 which was also the same in both measurements, see the geometrical situation in FIG. 1c:

$$\Phi \cdot \lambda 1 + X \cdot \lambda 1 = (\Phi + \Delta) \cdot \lambda 2 + Y \cdot \lambda 2.$$

Together with the previously mentioned equation, it is possible to calculate X and Y, so that the total travel distance of the object wave and, by way of the known angles α, β, γ as shown in FIG. 1c, the relative position as between direction and spacing of the object point 7 from the laser 3 or the camera 4 are known.

This is also in turn effected for all object points 7 of a viewing region 6 by means of the imaging points 17, corresponding to those object points 7, of the light-sensitive surface 16 of the camera 4, whereby the shape of the object in the viewing region 6 is known. By scanning a plurality of mutually adjoining or even overlapping viewing regions 6, it is thus possible, possibly with rotational movement of the object 1, to ascertain the three-dimensional shape of the object firstly relative to the measurement unit 2 and, when the position thereof is known, as an absolute three-dimensional shape.

Practical evaluation is implemented in that respect on the basis of the fringe patterns as shown in FIG. 2c which respectively show the difference between the initial condition and the measurement condition.

It will be appreciated that the above-described method and apparatus have been set forth solely by way of example and illustration of the invention and that various other modifications and alterations may be made without thereby departing from the spirit and scope of the invention. For example displacement of the illumination directions can be effected by a common or a plurality of separate, jointly actuable drive means such as stepping motors or piezoelectrically actuable translators.

What is claimed is:

1. A method of determining displacement of at least a part of the surface of a measurement object between an initial condition and a measurement condition and the shape of said surface of the measurement object, said method comprising:

determining said shape and said displacement using the same measurement method, based on the speckle effect; and wherein the shape of the surface of the measurement object is determined based on two partial measurement operations, between which the object is left in the same condition and at least one viewing parameter is varied.

2. A method as set forth in claim 1 wherein said at least one viewing parameter is an optical path of a light wave illuminating the surface of the object and reflected therefrom.

3. A method as set forth in claim 1 wherein said at least one viewing parameter is wavelength of light used.

4. A method as set forth in claim 1, wherein:

the displacement of at least part of the object points of the surface of the object, as between an initial condition and a measurement condition, is determined relative to each other;

the shape of the surface of the object is measured by means of speckle interferometry; and the variation in shape of the surface of the object between the initial condition and the measurement condition is determined as a three-dimensional displacement field, based on the shape of the surface of the object and the relative displacement of object points in three different directions in space between the initial condition and the measurement condition.

5. A method as set forth in claim 4 wherein the shape of the surface of the object is determined in the initial condition.

6. A method as set forth in claim 4 wherein the displacement of object points between the initial condition and the measurement condition is determined in displacement components which are oriented in three mutually perpendicular directions in space, by means of at least three differently directed illustrations of the object.

7. A method as set forth in claim 5 wherein the displacement of object points between the initial condition and the measurement condition is ascertained in displacement components which are in the direction of three mutually perpendicular directions in space by means of at least three differently directed illuminations of the object.

8. A method as set forth in claim 4 wherein said displacement field is defined by displacement parameters, and further comprising:
based on a position of the surface at each individual object point, converting said displacement field into tangential vectors and perpendicular vectors with respect to the surface for each object point; and
determining differences between tangential and perpendicular vectors of two adjacent objects points, which represent elongation over the object surface as an elongation field.

9. A method as set forth in claim 8, further comprising:
determining from the elongation field a stress field which represents stress obtaining at each point of the surface, taking into account material parameters which obtain at each point of a viewing region.

10. A method as set forth in claim 9 wherein the stress field for each object point of the viewing region includes stresses in the direction of the surface of the object.

11. A method as set forth in claim 1, wherein:
the displacement of the surface of the measurement object is a partial deformation of the surface of the measurement object, which deformation involves elongation or shrinkage of the measurement object; and
measurement is effected by a measurement unit held in a defined position relative to the surface of the measurement object, which relative position is identical for the initial condition and the measurement condition.

12. A method as set forth in claim 11 wherein said measurement unit is disposed directly on to the surface of the measurement object.

13. A method as set forth in claim 1, further comprising:
determining an absolute position of at least one object point of the surface of the object in at least one of the initial condition and the measurement condition; and
calculating absolute position of the entire surface of the object in the viewing region therefrom, both for the initial condition and also for the measurement condition.

14. A method as set forth in claim 13, wherein said step of calculating the absolute position of an object point of the surface of the object comprises:
determining absolute position of a measurement unit in space; and
ascertaining a relative position of the object point with respect to the measurement unit.

15. A method as set forth in claim 2 wherein a variation of the travel length of the optical path is effected by displacing at least one illumination unit.

16. A method as set forth in claim 15 wherein said at least one illumination unit is a laser.

17. A method as set forth in claim 2 wherein a variation in the travel length of the optical path is effected by displacing at least one deflection mirror arranged in the optical path, upstream of impingement on the measurement object.

18. A method as set forth in claim 17 wherein said displacement is effected transversely with respect to the viewing direction and the measurement direction, respectively.

19. A method as set forth in claim 17, wherein:
electronic speckle interferometry is performed by means of dual illumination; and
for varying the travel length, deflection mirrors are displaced transversely with respect to the viewing direction, by the same amount selectively towards the right and towards the left relative to a viewing direction.

20. A method as set forth in claim 17, wherein:
electronic speckle interferometry is performed by means of dual illumination; and
for varying the travel length, deflection mirrors are pivoted by the same amount about an axis which is perpendicular to the measurement plane defined by a viewing direction and an illumination direction.

21. A method as set forth in claim 2, wherein:
a laser beam is used to illuminate the surface of the object; and
a variation in the travel length of the optical path is effected by altering a wavelength of laser beam.

22. A measurement unit for three-dimensionally determining the shape and displacement of at least a part of the surface of a measurement object, comprising:
a speckle interferometer having
at least one laser,
at least three different object illumination directions for propagation of object beams from said laser, and
a camera having a light-sensitive surface;
a calculation unit for evaluating signals from the camera;
a display element for displaying evaluation results; and
means for displacing by a defined amount at least two of said illumination directions, in the same direction with respect to a viewing direction of the camera.

23. A measurement unit as set forth in claim 22, wherein:
said at least two illumination directions are arranged symmetrically relative to the viewing direction; and
one of said illumination directions other than said at least two illumination directions is in a first plane perpendicular to a second plane defined by said at least two illumination directions.

24. A measurement unit as set forth in claim 22 further comprising:
a common drive means for displacement of the illumination directions.

25. A measurement unit as set forth in claim 22 further comprising:
  a plurality of separate, jointly actable drive means for displacement of the illumination directions.

26. A measurement unit as set forth in claim 24 wherein said drive means comprises a stepping motor.

27. A measurement unit as set forth in claim 24 wherein said drive means comprises a piezoelectrically driven translator.

28. A measurement unit as set forth in claim 25 wherein said drive means comprise a plurality of stepping motors.

29. A measurement unit as set forth in claim 25 wherein said drive means comprise a plurality of piezoelectrically driven translators.

30. A measurement unit as set forth in claim 22 further comprising means for varying a wavelength of the laser.

31. A measurement unit as set forth in claim 22 further comprising at least one foot for placement on the surface of the measurement object in a defined position with respect to the surface.

32. A measurement unit as set forth in claim 31 including first, second and third feet which are not disposed on a line.

33. A measurement unit as set forth in claim 32 wherein said feet are arranged in the form of an isosceles triangle.

34. A measurement unit as set forth in claim 22, which is arranged at a defined location in space and includes a measurement device for determining the spacing and the direction of at least one object point of the surface of the measurement object relative to the measurement unit.

35. A method of determining displacement of at least a part of the surface of a measurement object between an initial condition and a measurement condition, and the shape of said surface of the measurement object, said method comprising:
  determining said shape and said displacement, using the same measurement method, based on the speckle effect;
  wherein the shape of the surface of the measurement object is determined by
  illuminating the surface of the object with light beams;
  making at least first and second partial measurements based on light reflected from said surface; and
  leaving the object in the same condition between the first and second partial measurements, while altering at least one of an optical path of one of the light beams illuminating the surface of the object and reflected therefrom, a wavelength of the light beams.

\* \* \* \* \*